United States Patent
Pawar et al.

(10) Patent No.: US 9,957,038 B2
(45) Date of Patent: May 1, 2018

(54) PROPELLER ASSEMBLIES AND PROPELLER BLADE RETENTION ASSEMBLY

(71) Applicant: GE Aviation Systems LLC, Grand Rapids, MI (US)

(72) Inventors: Rajendra Vishwanath Pawar, Karnataka (IN); Ravindra Shankar Ganiger, Bangalore (IN); Murugesan Periasamy, Bangalore (IN); David Raju Yamarthi, Bangalore (IN); Sandeep Kumar, Bangalore (IN); Amit Arvind Kurvinkop, Bangalore (IN); Bajarang Agrawal, Bangalore (IN); Nagashiresha G, Bangalore (IN)

(73) Assignee: GE Aviation Systems, LLC, Grand Rapids, MI (US)

( * ) Notice: Subject to any disclaimer, the term of this patent is extended or adjusted under 35 U.S.C. 154(b) by 232 days.

(21) Appl. No.: 14/740,337

(22) Filed: Jun. 16, 2015

(65) Prior Publication Data

US 2016/0368591 A1 Dec. 22, 2016

(51) Int. Cl.
*B64C 11/06* (2006.01)
*B64C 11/20* (2006.01)
*F01D 5/30* (2006.01)

(52) U.S. Cl.
CPC .............. *B64C 11/06* (2013.01); *B64C 11/20* (2013.01); *F01D 5/303* (2013.01)

(58) Field of Classification Search
CPC ....... B64C 11/06; B64C 11/20; F04D 29/325; F04D 29/329; F04D 29/362; F01D 5/303; F03D 1/0658; F03D 3/0418; F03D 3/064; F03D 7/0224
See application file for complete search history.

(56) References Cited

U.S. PATENT DOCUMENTS

| | | | |
|---|---|---|---|
| 2,318,486 A | | 5/1943 | Hoover |
| 2,436,612 A | * | 2/1948 | Sheets ..................... B64C 11/06 277/392 |
| 2,874,932 A | | 2/1959 | Sorensen |
| 3,434,546 A | | 3/1969 | Rodriguez et al. |
| 7,422,419 B2 | | 9/2008 | Carvalho |
| 7,445,427 B2 | * | 11/2008 | Gutknecht ............ F01D 17/162 415/160 |
| 8,753,088 B2 | | 6/2014 | Pfeiffer et al. |

FOREIGN PATENT DOCUMENTS

| | | |
|---|---|---|
| EP | 2862800 A1 | 4/2015 |
| EP | 3069989 A1 | 9/2016 |

OTHER PUBLICATIONS

European Search Report and Opinion issued in connection with corresponding EP Application No. 16174397.6 dated Oct. 20, 2016.

* cited by examiner

*Primary Examiner* — Kenneth Bomberg
*Assistant Examiner* — Hoon Choi
(74) *Attorney, Agent, or Firm* — General Electric Company; William Scott Andes

(57) ABSTRACT

Propeller blade assemblies and a propeller blade retention assembly including a sleeve for operably coupling a propeller blade to a hub wherein the sleeve retains the propeller blade within the hub and allows the propeller blade to rotate about its pitch axis and where the sleeve includes a self-aligning mechanism.

11 Claims, 8 Drawing Sheets

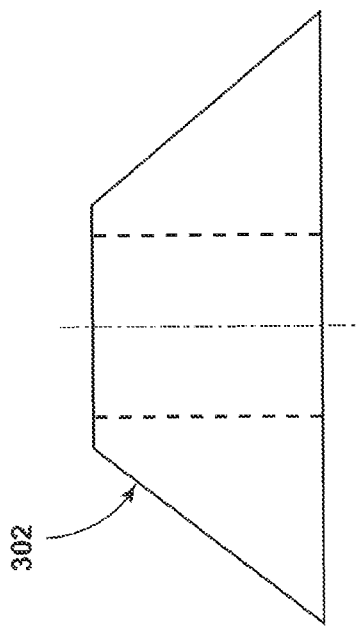
FIG. 8A
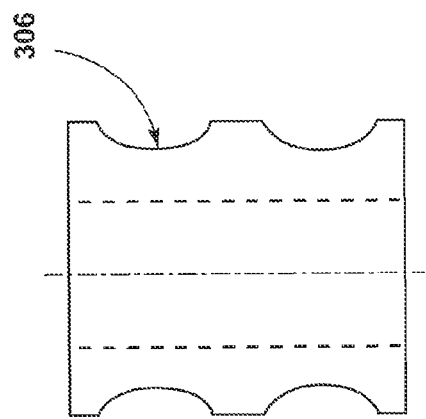
FIG. 8B
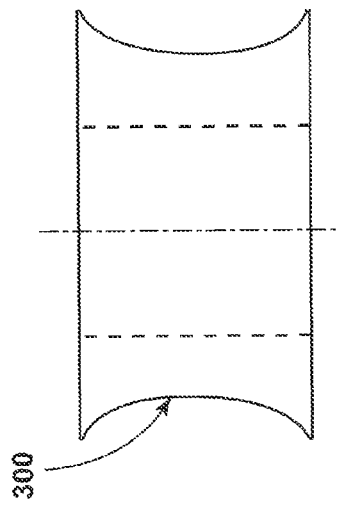
FIG. 8C
FIG. 8D

PROPELLER ASSEMBLIES AND PROPELLER BLADE RETENTION ASSEMBLY

BACKGROUND OF THE INVENTION

Propeller assemblies typically include multiple blades mounted to a hub, which is rotated by the engine. The blades can be line-removable and retained to the hub so as to supporting operating loads, including a centrifugal force component that acts in a direction parallel to the longitudinal axis of the propeller blade. Modern retention systems use an assembly of bearings to retain the propeller blade to the hub assembly. Each blade root is retained within its own socket for rotation therein about a pitch change axis through use of the assembly of bearings. These bearings can be preloaded or not preloaded.

Historically, retention systems of non-preloaded propeller blades rely on the weight of the blades to ensure that they experience sufficient centrifugal loading when rotating during operation that rocking of the retention bearings does not occur. However, modern lightweight blades may not experience sufficient centrifugal loading to prevent the bearing elements on one side of the bearing from becoming unloaded under the influence of bending loads imposed upon the blade during operation. Consequently, larger and heavier parts can be necessary for the retention mechanisms.

It is known to preload the blade and the bearings in order to maintain their stability under high centrifugal and thrust forces experienced during operation. Further, additional preloading mechanisms can be utilized to compensate for loss of preload on the bearings due to wear. The preloading tensions the system and braces it against operational centrifugal and thrust forces. The inclusion of additional preloaded assemblies results in more complex replacement and maintenance of parts. Further still, such designs use grease within the hub as lubrication and the grease loses its lubricating properties over time, leading to more frequent maintenance.

BRIEF DESCRIPTION OF THE INVENTION

In one aspect, an embodiment of the invention relates to a propeller assembly having a hub having a receiver recess, a sleeve located within the receiver recess and having a through passage defining a blade recess having a first contour, a propeller blade having a protrusion, with a second contour and received within the blade recess wherein the first contour and second contour are complementary and when the protrusion is inserted into the blade recess the sleeve having the first contour mates with the second contour of the protrusion of the propeller blade.

In another aspect, an embodiment of the invention relates to a propeller blade retention assembly having a sleeve for operably coupling a propeller blade to a hub wherein the sleeve retains the propeller blade within the hub and allows the propeller blade to rotate about its pitch axis and where the sleeve includes a self-aligning mechanism.

In yet another aspect, an embodiment of the invention relates to a propeller assembly, including a hub having a first piece operably coupled to a second piece to define at least one blade recess and where at least a portion of the blade recess includes a first contour, a propeller blade having a protrusion, with a second contour, received within the blade recess wherein the first contour and second contour are complementary and when the protrusion is inserted into the blade recess the hub having the first contour mates with the second contour of the protrusion of the propeller blade to define an interference structure configured to prevent radial movement of the blade.

BRIEF DESCRIPTION OF THE DRAWINGS

In the drawings:

FIGS. 8A-8D illustrate alternative shapes or contours that can be utilized in the propeller assemblies of FIGS. 2, 5, and 7.

DETAILED DESCRIPTION

Figure 1:
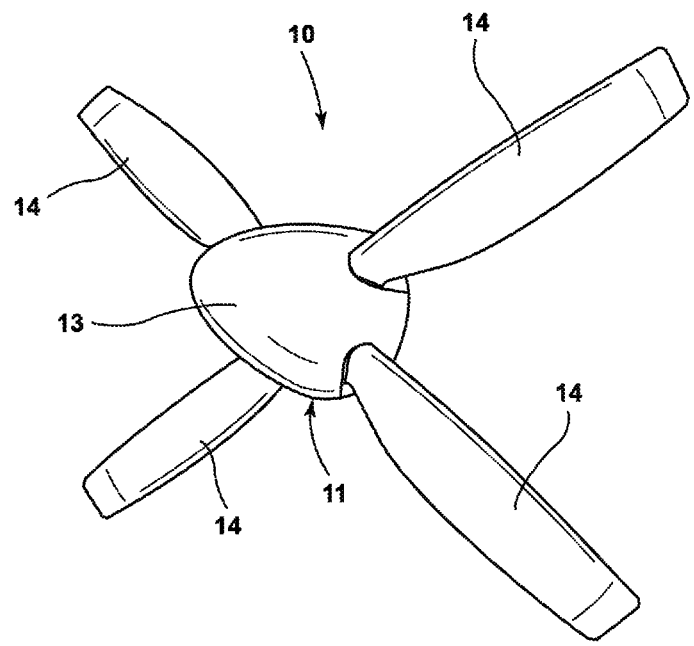
FIG. 1 is a schematic view of a propeller assembly including propeller blades.
Figure 2:
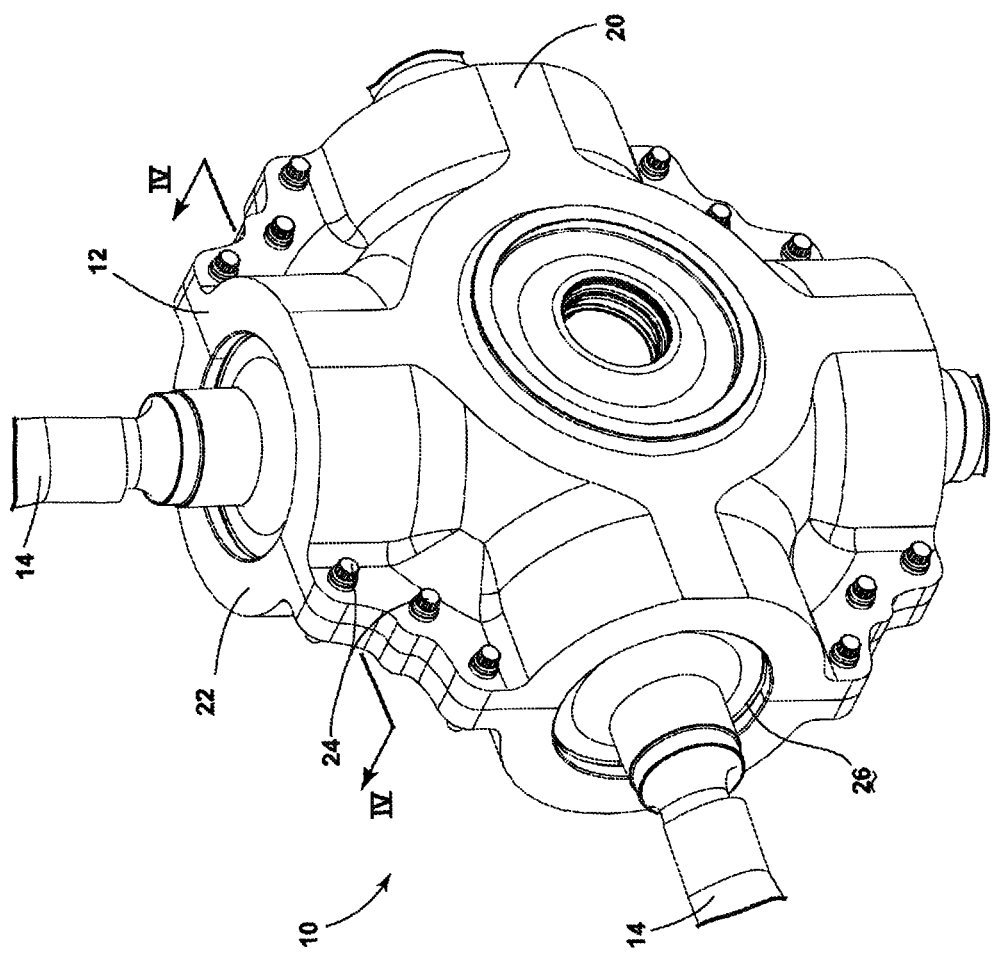
FIG. 2 is a perspective view of a portion of a propeller assembly, which can be used in the assembly of FIG. 1.

FIG. 1 illustrates a propeller assembly 10 including a hub assembly 11 and several propeller blades 14. The hub assembly 11 can include a cover 13 and a hub 12, which is more clearly illustrated in FIG. 2. The hub 12 provides a means to secure multiple propeller blades 14. The hub 12 can be formed from any suitable material including, but not limited to, metal or composite materials. The hub 12 can be formed in any suitable manner and can secure any number of propeller blades 14. Typically a propeller blade 14 is formed in a twisted airfoil shape and can be composed of any suitable material including, but not limited to, metal or composite materials. The propeller blade 14 converts rotary motion into a propulsive force. The propeller blade 14 can be line-removable to provide cost and maintenance advantages. The term line-removable indicates that the propeller blade 14 can be removed and replaced in the field. Line-removable propeller blades can be mounted to the hub 12 and must be retained while allowing relative rotatable motion.

Figure 3:
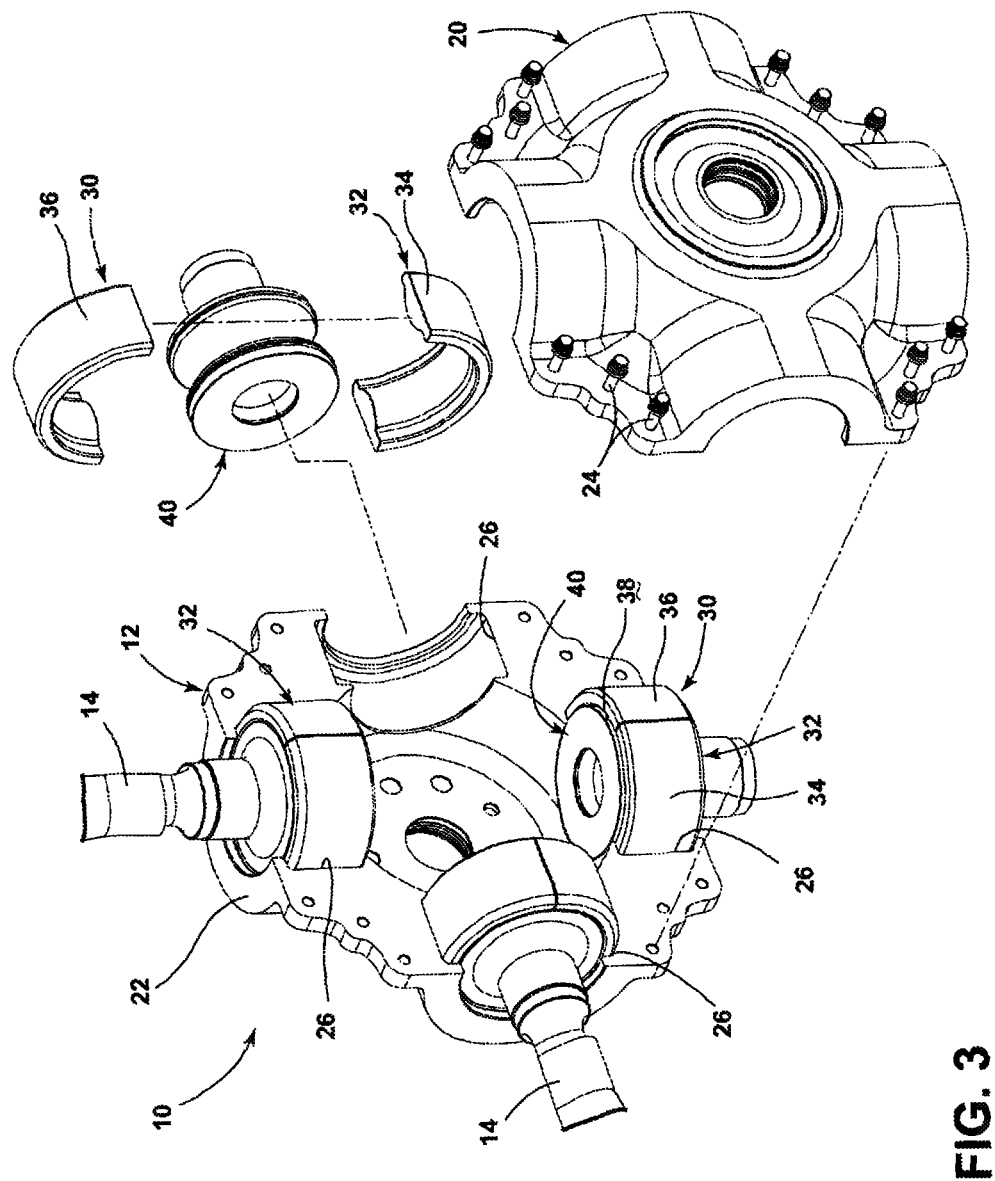
FIG. 3 is a perspective view of the portion of the propeller assembly of FIG. 2 with portions exploded.

FIG. 3 more clearly illustrates that the hub 12 includes a first or front hub portion 20 and a second or rear hub portion 22. The front hub portion 20 and the rear hub portion 22 can be operably mounted together via any suitable fasteners including, but not limited to, bolts 24. When the front hub portion 20 and the rear hub portion 22 are operably coupled together they define a set of receiver recesses 26. It will be understood that "a set" can include any number of receiver recesses, including only one receiver recess.

A receiver 30 can be located within the receiver recess 26. The receiver 30 has been illustrated as a sleeve 32. In the illustrated example, the sleeve 32 includes first and second pieces 34 and 36. While the sleeve 32 can be integrally formed, the multi-piece sleeve allows for ease of replacement within the field. Regardless of the number of pieces forming the sleeve 32, the sleeve 32 creates a through passage that defines a blade recess 38.

The blade recess 38 of the sleeve 32 can provide a receptacle for the propeller blade 14 to be inserted. More specifically, a protrusion 40 of the propeller blade 14 can be received within the blade recess 38. The protrusion 40 can include, but is not limited to, the blade root or an integral part of the blade root.

Figure 4:
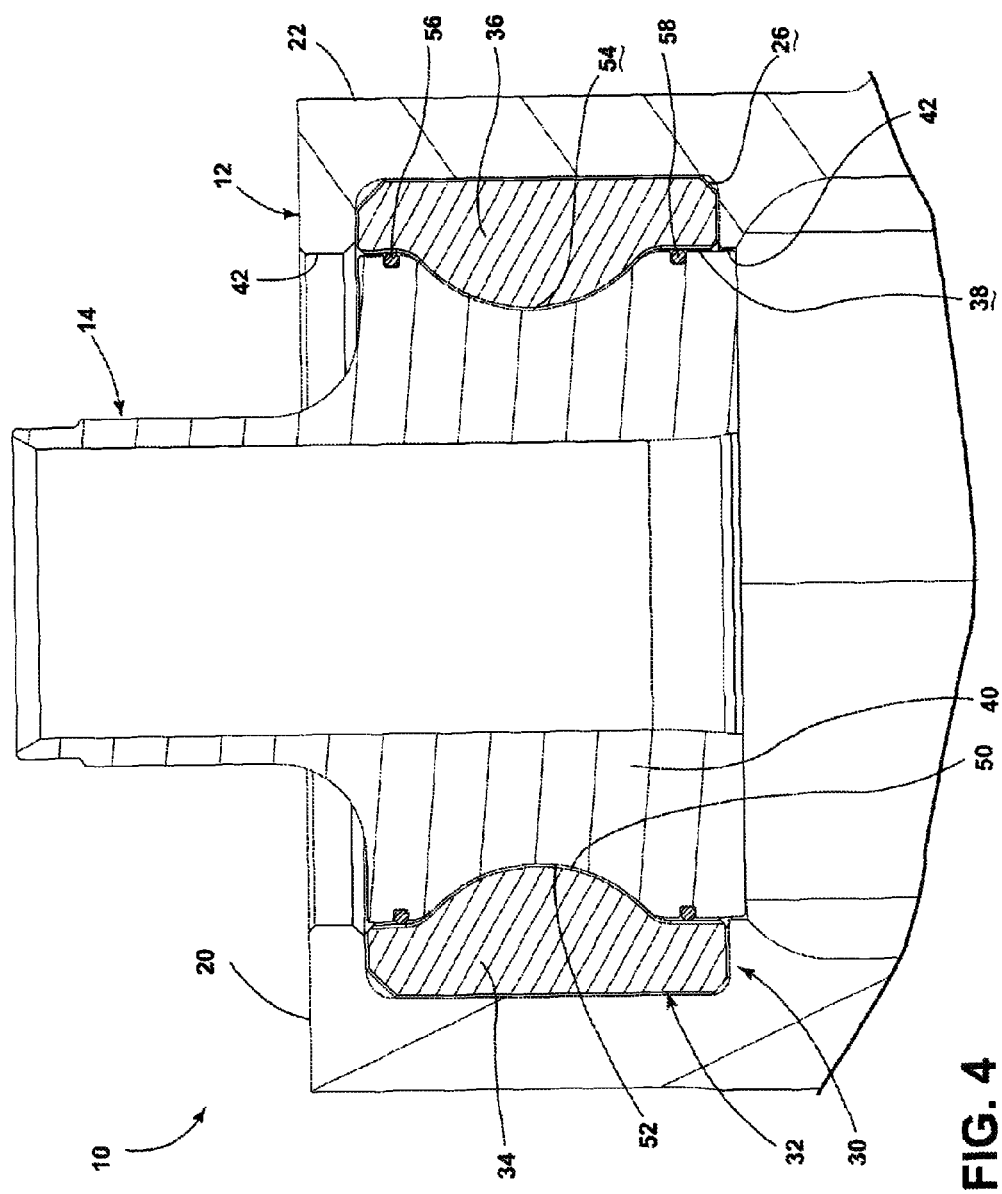
FIG. 4 is a cross-sectional view of a portion of the hub and a portion of a propeller blade of the propeller assembly of FIG. 2.

As can more clearly be seen in FIG. 4, annular shoulders 42 of the hub 12 effectively wrap around the sleeve 32 when the front hub portion 20 and the rear hub portion 22 are operably coupled. The annular shoulders 42 restrain the sleeve 32 from radial movement. Further, it can more clearly be seen that the sleeve 32 can include a first shape, profile, or contour 50 and the protrusion 40 of the propeller blade 14 can include a second shape, profile, or contour 52. The first contour 50 and second contour 52 are complementary and when the protrusion 40 is inserted into the blade recess 38 the first contour 50 mates with the second contour 52. In the illustrated example, the first contour 50 of the sleeve 32 has been illustrated as having a convex crescent shape while the second contour 52 of the protrusion 40 has been illustrated as having a concave crescent shape.

The sleeve 32 functions as a primary retention system to operably couple the propeller blade 14 to the hub 12 while still enabling the propeller blade 14 to rotate about its pitch axis. A gap 54 is defined between the first contour 50 and the second contour 52. The gap 54 can have a high precision clearance and can be filled with a lubricant including, but not limited to, oil impregnated lubricants to allow the propeller blade 14 to rotate with less friction. First and second seals 56 and 58 can be included at distal ends of the gap 54 to keep lubricants in place. Alternatively, one seal can be utilized to close a portion of the gap 54 and an alternative mechanism or part can be utilized to seal the other portion of the gap 54. Further, one or both the sleeve 32 and the protrusion 40 can include a friction reducing coating to further allow the propeller blade 14 to rotate with less friction. Any suitable friction reducing coating can be utilized including, but not limited to, a silver nitride coating.

During operation, the sleeve 32 is used for retaining the propeller blade 14 to the hub 12 while allowing relative rotatable motion there between and without requiring the need for preloading portions of the propeller assembly. The sleeve 32 helps to support very high thrust bending moments and the mating contours form a self-aligning mechanism that eliminates the preload requirement.

Figure 5:
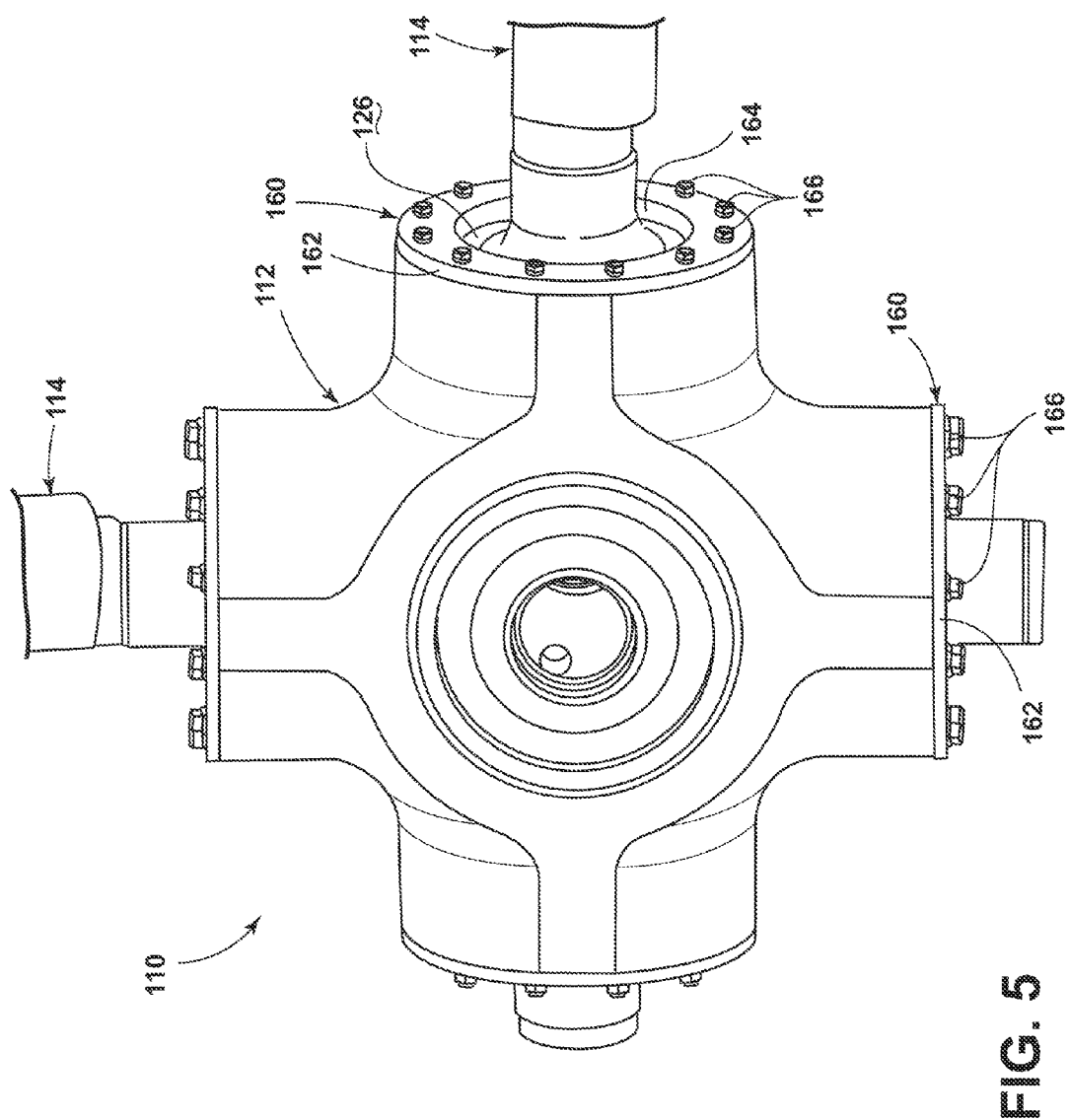
FIG. 5 is a perspective view of an alternative embodiment of a portion of a propeller assembly, which can be used in the assembly of FIG. 1.

FIG. 5 illustrates an alternative propeller assembly 110 according to a second embodiment of the invention. The propeller assembly 110 is similar to the propeller assembly 10 previously described and therefore, like parts will be identified with like numerals increased by 100, with it being understood that the description of the like parts of the propeller assembly 10 applies to the propeller assembly 110, unless otherwise noted.

Figure 6:
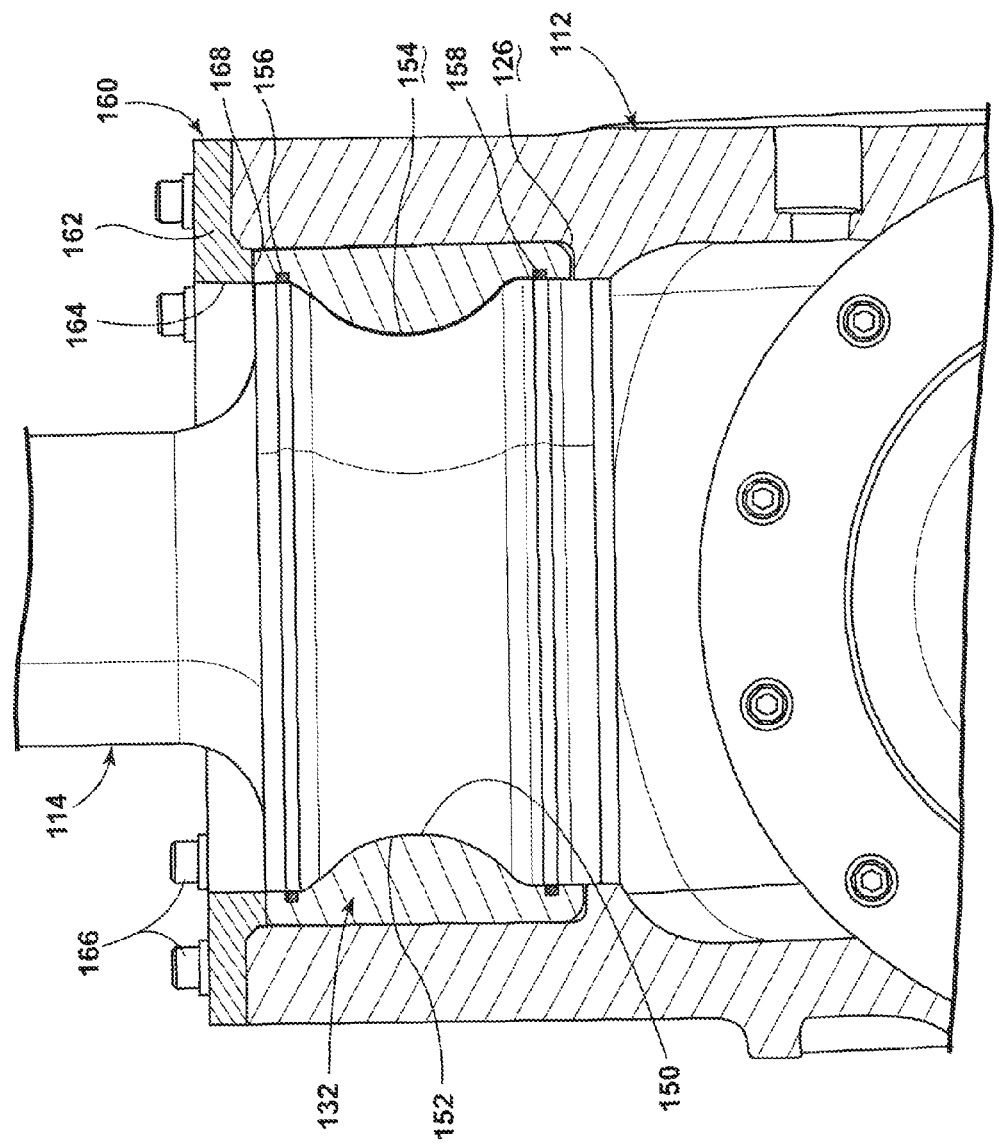
FIG. 6 is a cross-sectional view of a portion of a hub and a portion of a propeller blade of the propeller assembly of FIG. 5.

The sleeve 132 functions as a primary retention system to operably couple the propeller blade 114 to the hub 112 while still enabling the propeller blade 114 to rotate about its pitch axis. A gap 154 is defined between the first contour 150 and the second contour 152. The gap 154 can have a high precision clearance and can be filled with a lubricant including, but not limited to, oil impregnated lubricants to allow the propeller blade 114 to rotate with less friction. First and second seals 156 and 158 can be included at distal ends of the gap 154 to keep lubricants in place. Alternatively, one seal can be utilized to close a portion of the gap 154 and an alternative mechanism or part can be utilized to seal the other portion of the gap 154. Further, one or both the sleeve 132 and the protrusion 140 can include a friction reducing coating to further allow the propeller blade 114 to rotate with less friction. Any suitable friction reducing coating can be utilized including, but not limited to, a silver nitride coating. One difference between the second and first embodiments is that the hub 112 does not include front and rear pieces. Instead the receiver recess 126 is sized to allow both the sleeve 132 and the protrusion 140 of the propeller blade 114 to be inserted therein as can more clearly be seen in FIG. 6. Once the propeller blade 114 and its mating sleeve 132 are inserted, a retainer 160 can be operably coupled to the hub 112 to maintain the propeller blade 114 and sleeve 132 within the hub 112. In the illustrated example, the retainer 160 includes a ring 162 having a recess 164 through which the propeller blade 114 can pass and is sized to allow the propeller blade 114 to rotate therein. The ring 162 is illustrated as being mounted to the hub 112 through a variety of bolts 166 although it will be understood that any suitable fasteners can be utilized. The ring 162 can include a protrusion 168 that seats the sleeve 132 tightly within the hub 112 and does not allow for movement of the sleeve 132 within the receiver recess 126. Further, it will be understood that any suitable retainer can be used including, but not limited to discrete fasteners mounting the sleeve 132 to the hub 112. The ring 162 or any other suitable retainer can act as an outboard shoulder to retain the sleeve 132 from moving radially. As the ring 162 is removable, it allows the propeller blade 114 to be replaced without needing to form the hub in two halves.

Figure 7:
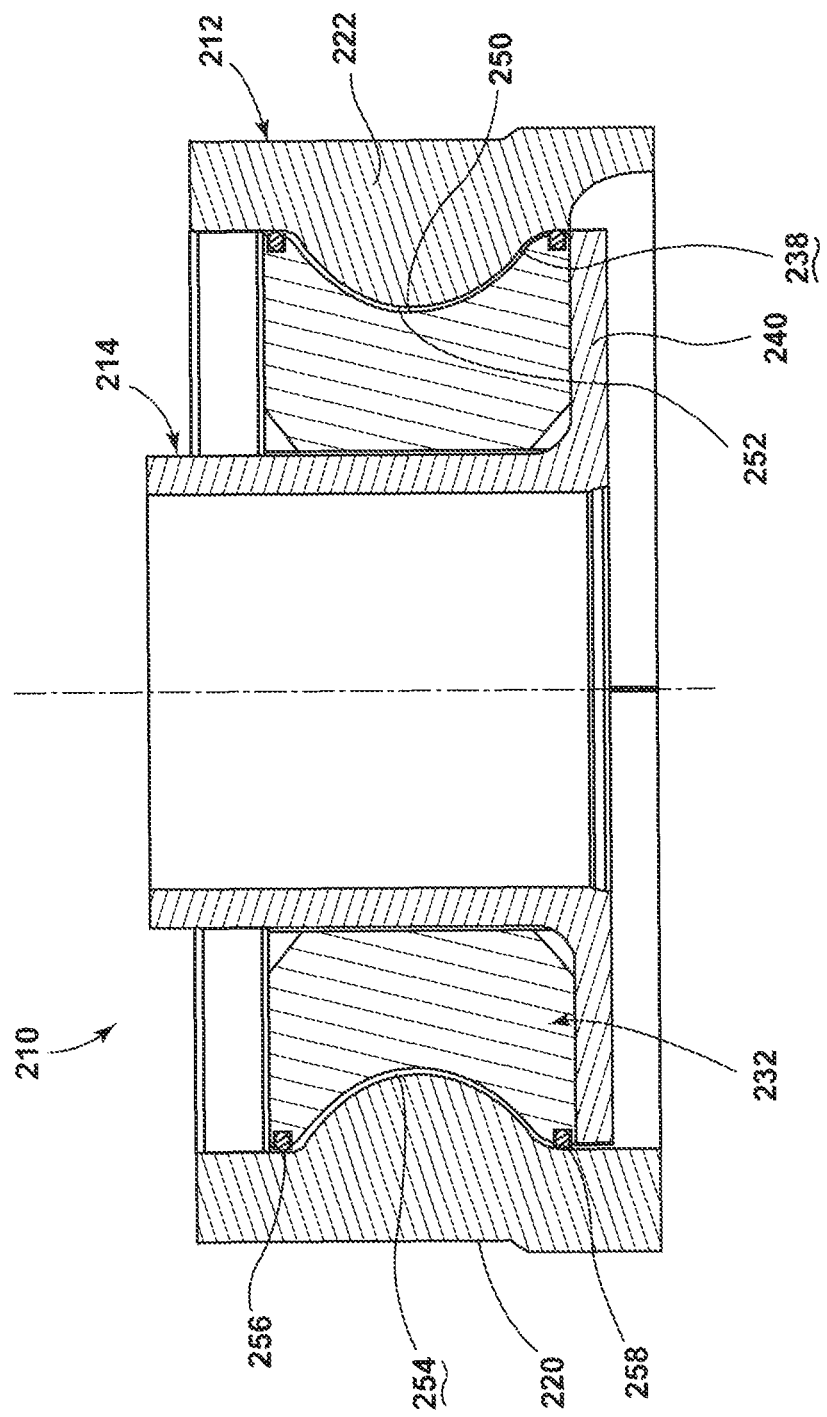
FIG. 7 is a cross-sectional view of yet another alternative embodiment of a portion of a propeller assembly, which can be used in the assembly of FIG. 1.

FIG. 7 illustrates an alternative propeller assembly 210 according to a third embodiment of the invention. The propeller assembly 210 is similar to the propeller assembly 10 and therefore, like parts will be identified with like numerals increased by 200, with it being understood that the description of the like parts of the propeller assembly 10 applies to the propeller assembly 210, unless otherwise noted.

One difference between the third embodiment and the prior two embodiments is that the protrusion 240 of the propeller blade 214 includes a first contour 250. More specifically, the propeller blade 214 has been illustrated as including a sleeve 232 and the sleeve 232 includes the first contour 250. The sleeve 232 can be integrally formed with the protrusion 240 or, as illustrated, the sleeve 232 can be operably coupled to the protrusion 240. The sleeve 232 can be operably coupled to the propeller blade 214 in any suitable manner including, but not limited to, that the sleeve 232 can be shrunk fit onto the protrusion 240.

While the hub 212 has also been illustrated as having first and second pieces 220 and 222, in the illustrated third embodiment, the first and second pieces 220 and 222 define a blade recess 238 and a portion of the blade recess 238 includes a second contour 252. More specifically, the second contour 252 can be created on the hub 212 in any suitable manner including, but not limited to, that the first and second pieces 220 and 222 can be machined to create the second contour 252. The first and second pieces 220 and 222 can be closed around the protrusion 240 such that it is received within the blade recess 238 of the hub 212 and such that the first and second contours 250 and 252 mate.

As with the previous examples, a gap 254 is defined between the first contour 250 and the second contour 252 and first and second seals 256 and 258 are located at distal ends of the gap 254. Oil impregnated lubricants can be included within the gap 254 to provide lubrication. Both the hub 212 and the sleeve 232 can include a friction reducing coating to further allow the propeller blade 214 to rotate with less friction. During operation, the propeller blade 214 rotates within the hub 212 and the first contour 250 mates with the second contour 252 and acts to retain the propeller blade 214 therein.

In the above embodiments, the sleeve acts as a propeller blade retention assembly for operably coupling the propeller blade and the hub. The sleeve includes a self-aligning mechanism in that the first contour mates with a second contour of the hub itself or with a second contour of the propeller blade. The mating contours cooperate to define an interference structure that prevents outboard radial movement of the propeller blade while permitting rotation of the propeller blade about its longitudinal axis for pitch control.

Further, while the first and second embodiments illustrate the sleeve as including a convex shape illustrates as a crescent contour any suitable contour, shape, or profile can be utilized. By way of further non-limiting examples, FIG. 8A illustrates a concave crescent contour 300, FIG. 8B illustrates a truncated cone contour 302, FIG. 8C illustrates a C-shape contour 304 and FIG. 8D illustrates a contour having multiple C-shapes 306. Alternatively, multiple sleeves could be utilized to form any suitable contour including, but not limited to, the contour formed in FIG. 8D.

The embodiments described above provide for a variety of benefits including that a sleeve having a contoured shape is used to retain the propeller blade and allow it to rotate about its pitch axis. The above-described embodiments are bearingless or without bearing assemblies as the sleeve replaces conventional bearings utilized in contemporary propeller assemblies and no preloading is required. The sleeve acts to stabilize the propeller blade against thrust bending. Both the part count and weight, as compared to conventional assemblies, is greatly reduced. Further, the above described embodiments utilize oil impregnated lubricants, which are less prone to contamination as compared to grease used in conventional assemblies. The above described embodiments are low cost, provide for easy assembly and repair, and allow for longer overhaul intervals. Further, the above described embodiments allow the propeller blade to continue to be line replaceable and do not require any specialized tooling to replace the propeller blade.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propeller assembly, comprising:
   a hub having a receiver recess;
   a sleeve located within the receiver recess and having a through passage defining a blade recess having a first contour; and
   a propeller blade having a protrusion, with a second contour and received within the blade recess;
   wherein the first contour and second contour are complementary and when the protrusion is inserted into the blade recess the sleeve having the first contour mates with the second contour of the protrusion of the propeller blade; and
   wherein a gap is defined between the first contour and the second contour;
   further comprising at least one seal configured to close a portion of the gap and oil located within the gap between a first seal and a second seal.

2. The propeller assembly of claim 1 wherein the sleeve includes multiple pieces.

3. The propeller assembly of claim 1 wherein the first contour includes a convex profile.

4. The propeller assembly of claim 1 wherein the convex profile includes a crescent shape.

5. The propeller assembly of claim 1, further comprising a friction reducing coating applied to at least one of the first contour or the second contour.

6. The propeller assembly of claim 1 wherein the hub further includes first and second pieces selectively operably couplable to define the receiver recess.

7. The propeller assembly of claim 1, further comprising a retainer selectively operably coupled to the hub and configured to retain the sleeve and the propeller blade within the hub when the retainer is coupled to the hub.

8. A propeller assembly, comprising:
   a hub having a first piece operably coupled to a second piece to define at least one blade recess formed by a wall having a profile defining a first contour; and
   a propeller blade having a protrusion, with a second contour, received within the blade recess;
   wherein the first contour and second contour are complementary and when the protrusion is inserted into the blade recess the hub having the first contour mates with the second contour of the protrusion of the propeller blade to define an interference structure configured to prevent radial movement of the blade; and
   wherein a gap is defined between the first contour and the second contour;
   further comprising first and second seals located at distal ends of the gap.

9. The propeller assembly of claim 8 wherein the propeller blade includes a sleeve and the sleeve includes the second contour.

10. The propeller assembly of claim 9 wherein the sleeve is operably coupled to the protrusion.

11. A propeller assembly, comprising:
    a hub having a first piece operably coupled to a second piece to define at least one blade recess formed by a wall having a profile defining a first contour; and
    a propeller blade having a protrusion, with a second contour, received within the blade recess;
    wherein the first contour and second contour are complementary and when the protrusion is inserted into the blade recess the hub having the first contour mates with the second contour of the protrusion of the propeller blade to define an interference structure configured to prevent radial movement of the blade; and
    wherein a gap is defined between the first contour and the second contour;

further comprising first and second seals located at distal ends of the gap and a lubricant located within the gap between the first and second seals.

* * * * *